United States Patent
Yao

(10) Patent No.: US 11,483,253 B2
(45) Date of Patent: Oct. 25, 2022

(54) NETWORK RESOURCE PUSHING METHOD, DEVICE, AND STORAGE MEDIUM

(71) Applicants: Beijing Jingdong Shangke Information Technology Co., Ltd, Beijing (CN); Beijing Jingdong Century Trading Co., Ltd., Beijing (CN)

(72) Inventor: Xinming Yao, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 0 days.

(21) Appl. No.: 17/426,419

(22) PCT Filed: Jan. 3, 2020

(86) PCT No.: PCT/CN2020/070173
§ 371 (c)(1),
(2) Date: Jul. 28, 2021

(87) PCT Pub. No.: WO2020/168841
PCT Pub. Date: Aug. 27, 2020

(65) Prior Publication Data
US 2022/0109640 A1 Apr. 7, 2022

(30) Foreign Application Priority Data
Feb. 21, 2019 (CN) .......................... 201910128860.6

(51) Int. Cl.
*H04L 47/78* (2022.01)
*H04L 47/762* (2022.01)
(Continued)

(52) U.S. Cl.
CPC .......... *H04L 47/781* (2013.01); *H04L 47/762* (2013.01); *H04L 47/803* (2013.01); *H04L 47/808* (2013.01); *H04L 67/1021* (2013.01)

(58) Field of Classification Search
CPC ... H04L 47/781; H04L 47/762; H04L 47/803; H04L 47/808
See application file for complete search history.

(56) References Cited

U.S. PATENT DOCUMENTS

2012/0327119 A1* 12/2012 Woo .................. G06F 3/147
 345/633
2013/0218721 A1* 8/2013 Borhan .............. G06Q 30/0267
 705/26.41
(Continued)

FOREIGN PATENT DOCUMENTS

| CN | 109040202 A | 12/2018 |
|---|---|---|
| CN | 109241451 A | 1/2019 |
| CN | 109359247 A | 2/2019 |

OTHER PUBLICATIONS

International Search Report and Written Opinion for International Application No. PCT/CN2020/070173, dated Mar. 27, 2020, 7 pages.

*Primary Examiner* — Aftab N. Khan
(74) *Attorney, Agent, or Firm* — RatnerPrestia

(57) ABSTRACT

A network resource pushing method, a device, and a storage medium. The method comprises: a server receiving information of a network resource accessed by a user, and information of the environment of the user when the user accessed the network resource (101); the server applying, according to the information of the environment of the user, a pre-established scenario determination model to determine a user scenario (102); the server establishing an association model between the user scenario and the type of network resource accessed by the user (103); and the server receiving (Continued)

information of a current environment of the user, applying the scenario determination model to determine a current scenario corresponding to the information of the current environment of the user, and pushing to the user, according to the association model, a network resource having a type corresponding to the determined current scenario (104).

16 Claims, 3 Drawing Sheets

(51) Int. Cl.
*H04L 47/80* (2022.01)
*H04L 67/1021* (2022.01)

(56) References Cited

U.S. PATENT DOCUMENTS

2014/0098127 A1* 4/2014 Fein .................. G06F 3/011
                                                  345/633
2016/0034483 A1   2/2016 Ge et al.

\* cited by examiner

NETWORK RESOURCE PUSHING METHOD, DEVICE, AND STORAGE MEDIUM

CROSS-REFERENCE TO RELATED APPLICATIONS

This application is a national stage of International Application No. PCT/CN2020/070173, filed on Jan. 3, 2020, which claims the priority from Chinese Patent Application No. 201910128860.6, filed on Feb. 21, 2019 and entitled "Network Resource Pushing Method, Device, and Storage Medium." Both of the aforementioned applications are hereby incorporated by reference in their entireties.

TECHNICAL FIELD

The present disclosure relates to the field of network technology, and particularly to a method and apparatus for pushing a network resource, a storage medium and an electronic device.

BACKGROUND

In an existing method of recommending an application page (e.g., a page of an information application, a page of a streaming media application, and a page of a store application) or an HTML (Hyper-Text Markup Language) page, data such as a user behavior is analyzed, studied and determined by burying a point on a page, so as to recommend information (e.g., a commodity, news information, a song and a video) that may be of interest to a user.

SUMMARY

Embodiments of the present disclosure proposes a method and apparatus for pushing a network resource, a storage medium and an electronic device, to implement pushing a network resource based on a scenario.

The technical solution of the present disclosure is implemented by:

A method for pushing a network resource, including:

receiving information of a network resource accessed by a user, the information of the network resource being reported by a device, and environment information of the user when the user accessing the network resource;

ascertaining, based on the environment information of the user when the user accessing the network resource, a scenario where the user is located by using a pre-established scenario determination model;

establishing an association model between the scenario where the user is located and a type of the network resource accessed by the user;

receiving, from the device, current environment information of the user, and ascertaining, based on the current environment information of the user, a current scenario corresponding to the current environment information of the user by using the scenario determination model; and pushing, according to the association model between the scenario where the user is located and the type of the network resource accessed by the user, a network resource of a type corresponding to the ascertained current scenario to the user.

The receiving, from the device, current environment information of the user includes: receiving, from the device, current device data collected through a sensor.

The environment information of the user when the user accessing the network resource is acquired by:

collecting environment location information through a sensor carried by the device, and collecting an environment photograph through a camera carried by the device;

the ascertaining the scenario where the user is located includes:

inputting the environment location information and the environment photograph into the pre-established scenario determination model to obtain a corresponding scenario.

The information of the network resource accessed by the user, the information of the network resource being reported by a device includes:

an address of a webpage accessed by the user and a content tag clicked by the user;

or includes the address of the webpage accessed by the user, the content tag clicked by the user and a time length of the user staying on the webpage.

The content tag comprises one or more of: a news information tag and a streaming media tag.

The device is an AR device, a VR device, or an MR device.

The pushing, according to the association model between the scenario where the user is located and the type of the network resource accessed by the user, a network resource of a type corresponding to the current scenario to the user includes:

searching, according to identifier information of the user, an association model between the scenario where the user is located and the type of the network resource accessed by the user, the found association model being corresponding to the user, ascertaining a type of network data corresponding to the current scenario according to the association model, and pushing the network resource to the user according to the ascertained type of the network data.

An apparatus for pushing a network resource, including:

a scenario determination model saving module, configured to save a scenario determination model, the model being used to determine a scenario according to environment information;

a receiving and scenario determining module, configured to receive information of a network resource accessed by a user, the information of the network resource being reported by a device, and environment information of the user when the user accessing the network resource; input the environment information of the user when the user accessing the network resource into the scenario determination model to obtain a scenario where the user is located; send the obtained scenario where the user is located and the information of the network resource accessed by the user to an association model establishing module; receive, from the device, current environment information of the user, and input the current environment information of the user into the scenario determination model to obtain a current scenario where the user is currently located; and send the obtained current scenario to a pushing module;

the association model establishing module, configured to establish an association model between the scenario where the user is located and a type of the network resource accessed by the user, based on the scenario where the user is located and the information of the network resource accessed by the user received from the receiving and scenario determining module; and the pushing module, configured to receive the obtained current scenario sent from the receiving and scenario determining module, and push a network resource of a type corresponding to the obtained current scenario to the user according to the established association model between the scenario where the user is located and the type of the network resource accessed by the user.

The environment information of the user when the user accessing the network resource received by the receiving and scenario determining module includes:

environment location information collected through a sensor carried by the device, and an environment photograph collected through a camera carried by the device.

The information of the network resource accessed by the user, reported by the device and received by the receiving and scenario determining module includes: an address of a webpage accessed by the user and a content tag clicked by the user;

or the address of the webpage accessed by the user, the content tag clicked by the user, and a time length of the user staying on the webpage.

The content tag clicked by the user and received by the receiving and scenario determining module comprises one or more of a news information tag and a streaming media tag.

The device is an AR device, a VR device, or an MR device.

A non-transitory computer readable storage medium, storing an instruction, wherein the instruction, when executed by a processor, causes the processor to perform operations included in the above described method for pushing a network resource.

An electronic device, comprising the above described non-transitory computer readable storage medium and the processor enabled to access the non-transitory computer readable storage medium.

DETAILED DESCRIPTION OF EMBODIMENTS

After analysis, the inventor finds that, in the existing network resource recommendation method, only the past behavior such as the user accessing a network resource is generally considered, and the requirements of the user for different network resources in different real scenarios are not considered. Therefore, embodiments of the present disclosure provide a method and apparatus for recommending a network resource, a storage medium and an electronic device.

Figure 1A:
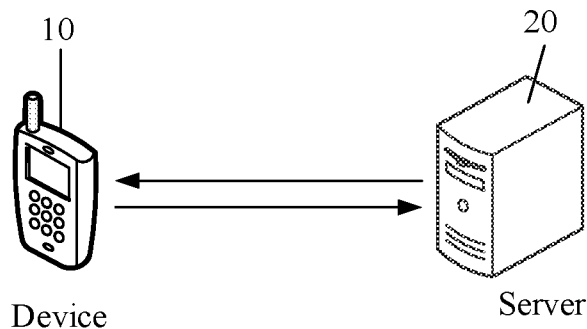
FIG. 1A is a schematic application diagram of a method for pushing a network resource according to an embodiment of the present disclosure.

FIG. 1A is a schematic application diagram of a method for recommending a network resource according to an embodiment of the present disclosure. Referring to FIG. 1, in a scenario where the method for recommending a network resource is applied, there is a device 10 and a server 20. The device 10 and the server 20 may be connected via a communication network. The communication network includes a wireless network and a wired network. Here, the wireless network includes a combination of one or more of a wireless wide area network, a wireless local area network, a wireless metropolitan area network and a wireless personal area network. Network entities in the network include a router, a gateway, and the like, but are not illustrated in the drawing. The device 10 may exchange information with the server 20 via the communication network, for example, may download an application (e.g., a shopping application or a map application) from the server 20.

Here, the server 20 may be configured to: receive information of a network resource accessed by a user which is reported by the device 10, and environment information of the user when the user accessing the network resource; ascertain, based on the environment information of the user when the user accessing the network resource, a scenario where the user is located by using a pre-established scenario determination model; establish an association model between the scenario where the user is located and a type of the network resource accessed by the user; receive, from the device, current environment information of the user, and ascertain, according to the current environment information of the user, a current scenario where the user is currently located by using the scenario determination model, the ascertained scenario corresponding to the current environment information of the user; and push, according to the association model between the scenario where the user is located and the type of the current network resource accessed by the user, a network resource of a type corresponding to the ascertained current scenario to the user.

The device 10 may be configured to: receive an instruction for authorizing push of a network resource inputted by a user on the device; detect that the user accesses a webpage, record network access data of the user accessing the webpage in real time; and meanwhile, acquire current environment information from a sensor and a camera of the device 10 in real time; upload identifier information of the user, the network access data of the user and the current environment information to the server 20; and receive a network resource pushed by the server according to the current environment information.

Embodiments of the present disclosure will be further described in detail below with reference to the accompanying drawings.

Figure 1B:
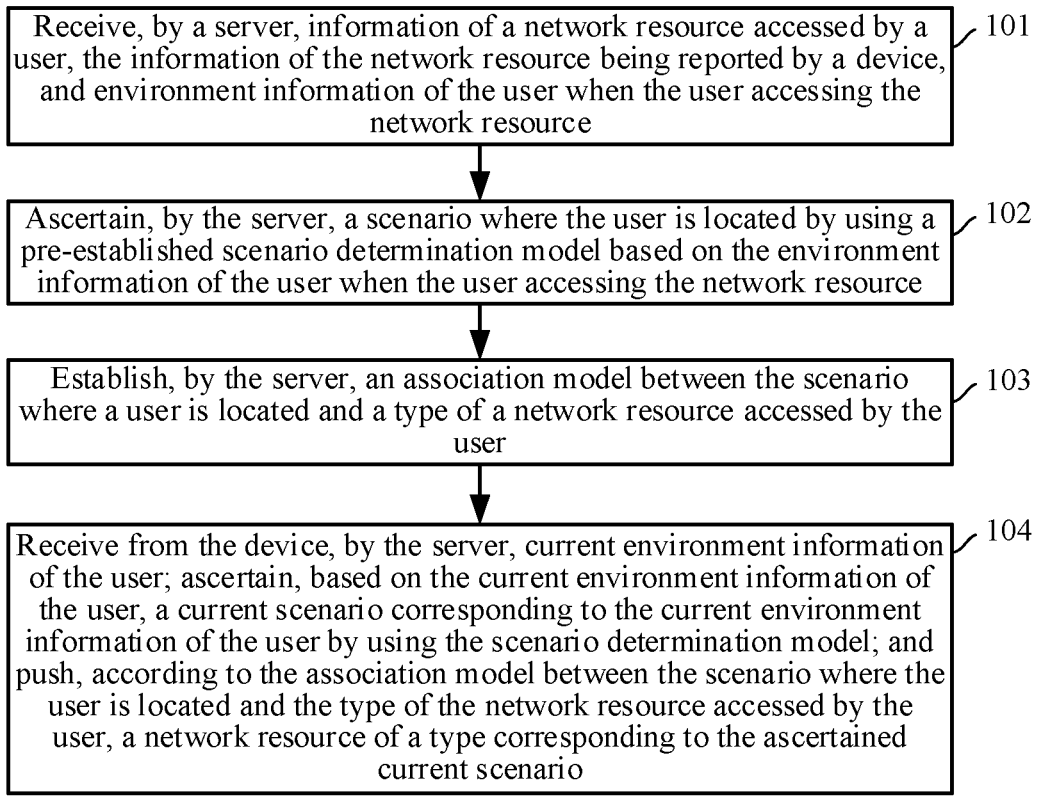
FIG. 1B is a flowchart of a method for pushing a network resource provided in an embodiment of the present disclosure.

FIG. 1B is a flowchart of a method for pushing a network resource provided in an embodiment of the present disclosure. The steps of the method are as follows.

Step 101, receiving, by a server, information of a network resource accessed by a user, where the information of the network resource is reported by a device, and environment information of the user when the user accessing the network resource.

Step 102, ascertaining, by the server, a scenario where the user is located by using a pre-established scenario determination model, based on the environment information of the user when the user accessing the network resource.

Here, the scenario determination model is used to determine a scenario based on the environment information.

Step 103, establishing, by the server, an association model between the scenario where the user is located and a type of the network resource accessed by the user.

The server may continuously perform the above steps 101-103 for each user in real time, such that the established association model between the scenario where the user is located and the type of the network resource accessed by the user is continuously improved.

Step 104, receiving, by the server, current environment information of the user sent by the device; ascertaining, based on the current environment information of the user, a current scenario where the user is currently located by using the scenario determination model, where the ascertained current scenario corresponds to the current environment information of the user; and pushing a network resource of a type corresponding to the ascertained current scenario to the user according to the association model between the scenario where the user is located and the type of the network resource accessed by the user.

After an association model between a scenario where the user is located and a type of a network resource accessed by the user is established for this user, step 104 may be performed.

According to the method in the embodiment of the present disclosure, after ascertaining the current scenario where the user is currently located, the server may recommend a commodity similar to the commodity that the user ever accesses or purchases in the current scenario to the user, thus implementing a scenario-based recommendation.

Figure 2:
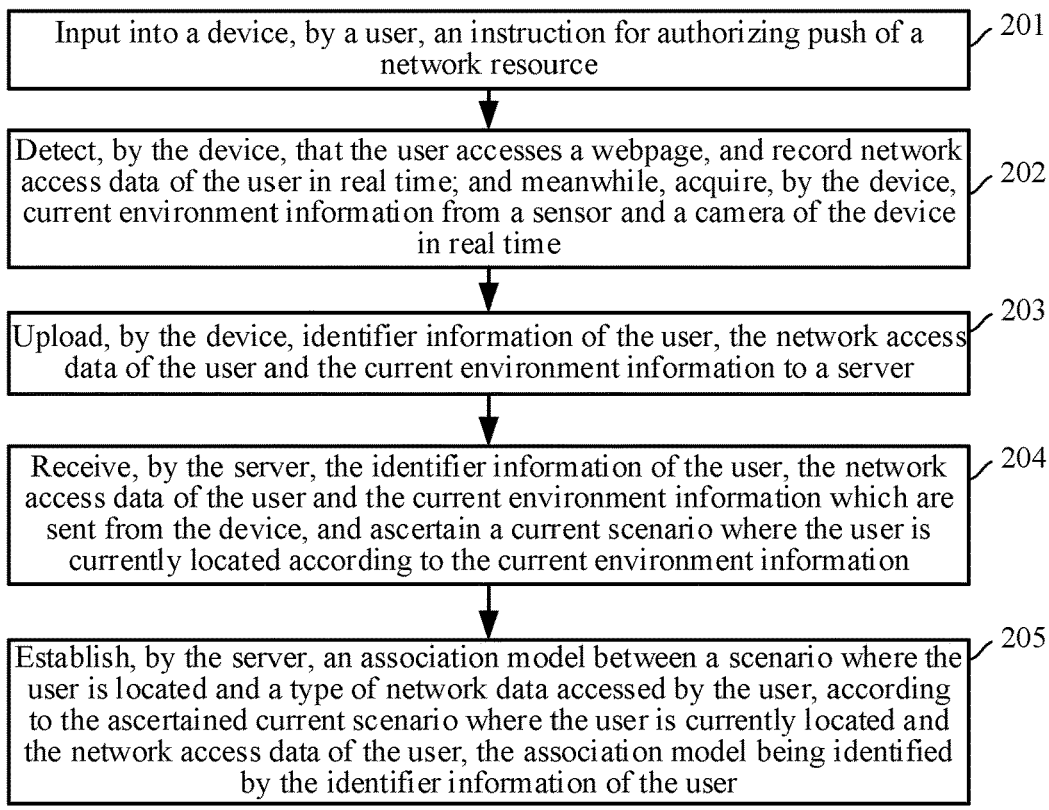
FIG. 2 is a flowchart of a method of establishing an association model between a scenario where a user is located and a type of a network resource accessed by the user, provided in an embodiment of the present disclosure.

FIG. 2 is a flowchart of a method of establishing an association model between a scenario where a user is located and a type of a network resource accessed by the user, provided in an embodiment of the present disclosure. The steps of the method are as follows:

Step 201, inputting, by a user, an instruction for authorizing the push of a network resource on a device.

For example, the device is an AR (augmented reality) device, a VR (virtual reality) device, an MR (mixed reality) device, or another mobile device (e.g., a mobile phone).

When the method for recommending a network resource in the embodiment of the present disclosure is applied, private information of the user needs to be collected, the private information including environment information of the user, and the like. Therefore, before the method is applied, an authorization from the user is required. Here, the authorization instruction includes an authorization to a hardware device acquiring the environment information. The hardware device includes, for example, a camera, and various sensors built in the device.

Step 202, detecting, by the device, that the user accesses a webpage, and recording network access data of the user accessing the webpage in real time; and meanwhile, acquiring, by the device, current environment information from a sensor and a camera of the device in real time.

The network access data of the user includes: an address of the webpage accessed by the user, and a content tag clicked by the user (including content type, content name, content attribute, and the like), a time length of the user staying on the webpage, and the like. The content type includes, for example, a news information type, a streaming media type, a commodity type. The content attribute includes, for example, an inventory of commodities.

The sensor includes, for example, a gyroscope, an infrared sensor, and a distance sensor, and mainly collects environment location information such as a geographical location, a distance between objects, and the like. The camera is used to collect an environment image. Here, the gyroscope is also called an angular velocity sensor, and a measured physical quantity includes, for example, an angular velocity of rotation when the device is deflected and tilted. Through the gyroscope, the motion state of the device may be detected.

Step 203, uploading, by the device, identifier information of the user, the network access data of the user and the current environment information to a server.

The device may locally cache the network access data of the user for a current page and the current environment information, and upload the network access data of the user for the current page and the current environment information to an application server before the current page is closed or redirected, to ensure the accuracy of the uploaded data, that is, to ensure a corresponding relationship between the network access data of the user for the current page and the current environment information.

Step 204, receiving, by the server, from the device the identifier information of the user, the network access data of the user and the current environment information, and ascertaining a scenario where the user is currently located according to the current environment information.

In practical application, an artificial intelligence learning system may be used to learn environment images collected by the camera in various scenarios in combination with the environment location information collected by the sensor in advance, to obtain a scenario determination model. Thereafter, the server uses the scenario determination model to analyze the current environment information received from the device to obtain a corresponding scenario.

For example, the server may analyze each image of a video collected by the camera, to infer a specific scenario where the user uses the device according to the environment information, the character information and the object information in the image.

Step 205, establishing, by the server, an association model between a scenario where the user is located and a type of network data accessed by the user, based on the scenario where the user is currently located and the network access data of the user, the association model being identified by the identifier information of the user.

In practical applications, a dictionary may be established between the scenario where the user is located and the type of the network data accessed by the user.

The server may continuously perform the above steps 201-205 for each user in real time, such that the established association model between different scenarios where the each user is located and types of network resources accessed by the user is continuously improved.

Figure 3:
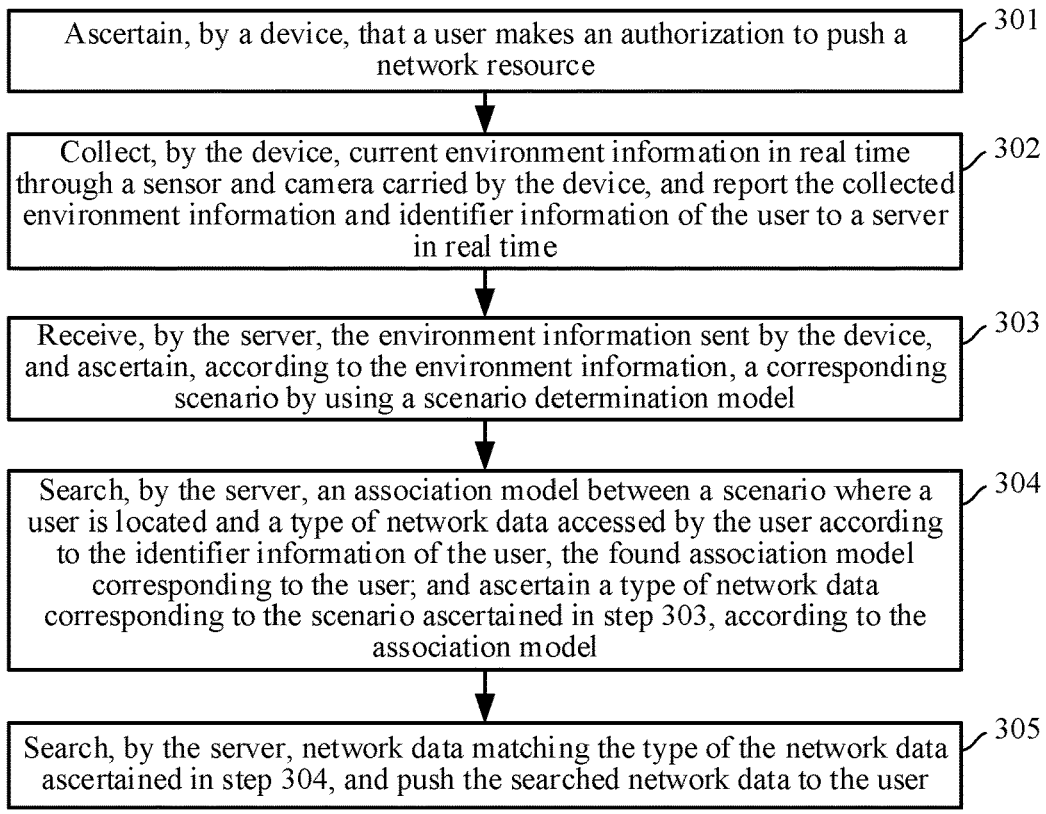
FIG. 3 is a flowchart of a method of pushing a network resource to a user according to an established association model between a scenario where the user is located and a type of a network resource accessed by the user, provided in another embodiment of the present disclosure.

FIG. 3 is a flowchart of a method of pushing a network resource to a user according to an established association model between a scenario where the user is located and a type of a network resource accessed by the user, provided in another embodiment of the present disclosure. The specific steps of the method are as follows:

Step 301, ascertaining, by a device, that a user makes an authorization to push a network resource. Here, this step includes: ascertaining, by the device, that the user authorizes a hardware device to collect current environment information.

Step 302, collecting, by the device, current environment information in real time through a sensor and camera carried by the device, and reporting the collected environment information and identifier information of the user to a server in real time.

Step 303, receiving, by the server, the environment information sent by the device, and ascertaining, according to the received=environment information, a corresponding scenario by using a scenario determination model.

Step 304, searching, by the server, an association model between a scenario where a user is located and a type of network data accessed by the user according to identifier information of the user, the found association model corresponding to the user; and ascertaining a type of network data corresponding to the scenario ascertained in step 303, according to the association model.

Step 305, searching, by the server, network data matching the type of the network data ascertained in step 304, and pushing the searched network data to the user.

For example, the server may display the pushed network data at a preset recommendation location of an application page or an HTML page accessed by the user. The network data may be a website, a text, a picture, or the like.

Specific application examples of the present disclosure are given below:

Example 1

This example targets at a scenario where the user does shopping on a shopping APP using an AR device in an indoor environment.

1) The AR device collects an environment picture through a camera and collects environment location information through a sensor, and meanwhile records network access data of the user (e.g., the name of the shopping APP accessed by the user, the address of a webpage accessed by the user, and a commodity tag (e.g., a name or an inventory) clicked by the user).

2) When ascertaining that the user is about to redirect or close a current webpage, the AR device sends the environment picture collected by the camera and the environment location information collected by the sensor during the user staying on the webpage, the recorded access data of the user for the webpage, and the time length of the user staying on the webpage to the server.

3) Based on the environment picture and the environment location information that are respectively collected by the camera and the sensor and sent by the AR device, the server performs a calculation using a pre-established scenario determination model, to obtain that the scenario where the user is located is indoor and relatively static, and determine that the user sits on a sofa.

Particularly, the scenario determination model may determine a scenario according to the following elements:

1. Environment: the environment in this example referring to a room;

2. Person: the person in this example referring to a number of people including an adult and a child;

3. Object: the object in this example referring to the sofa on which an adult sits, a table and a chair, a television, a refrigerator, an oven, a desk, or the like; and 4. Perspective: relatively static.

Accordingly, it may be determined that the current scenario is an indoor family living room and is relatively stationary, and in the scenario the user sits on the sofa. Whether the perspective is static or moving is determined by, for example, analyzing the continuity between the environment pictures.

4) The server ascertains, based on the association model previously established for the user between the scenario where the user is located and the type of the network data accessed by the user, that the user has a high probability of accessing a certain kind of commodity when using the shopping APP in this scenario. Thus, the server searches a highest-selling commodity in commodities of this kind on the shopping APP, and pushes the tag of the commodity to the recommendation location of the webpage that the user is accessing.

In addition, if the server further determines that there is a child in the scenario according to the scenario determination model, the server pushes the relevant contents of books and stationeries of young children to the page of the shopping app that the user is viewing, for display.

In addition, if it is determined that the perspective is constantly moving according to the scenario determination model, it may also push furniture decoration-related news or a family fun video to the user.

In addition, the server may further statisticize the types of the commodities that the user accesses most on the shopping APP in the same scenario in the latest preset time length, and thus push the related information of a commodity of this type to the user.

Example 2

This example is targeting at a scenario in a mobile environment where the user uses an AR device.

1) The AR device collects an environment picture through a camera and collects environment location information through a sensor.

2) The AR device sends the environment picture collected by the camera and the environment location information collected by the sensor to the server.

3) The server captures visual information within the focus range of the visual field of the user based on the environment picture collected by the camera, to ascertain that the user is looking for a restaurant or viewing a certain commodity. The server ascertains the geographical location of the user based on the environment location information collected by the sensor. For example, the server may analyze the word appearing in the environment picture, and confirm the word as a restaurant name, and thus ascertain that the user is looking for a restaurant.

4) The server ascertains that the user is indeed looking for a restaurant according to the analysis result within the latest preset time length, and records an association relationship between a user identifier, time and the geographical location and the user behavior: looking for a restaurant.

5) Afterwards, when receiving the environment picture collected by the camera and the environmental location information collected by the sensor which are sent by the AR device again, the server may ascertain the user behavior according to the association relationship established in step 4). For example, if the user behavior is "looking for a restaurant," the information of a restaurant in the current geographical location is pushed to the visual location of the AR device by means of voice or image.

The server may perform the analysis in step 3) in real time according to the environment picture and the environment location information which are continuously sent by the AR device. In addition, if the server finds, according to the analysis result, that the user behavior of the user at the same geographical location in the same time period changes, the server updates the user behavior in the association relationship recorded in step 4).

Example 3

This example is targeting at a scenario where the user uses an AR device to frequently access a shopping app regardless of time and place.

1) The AR device collects an environment picture through a camera and collects environment location information through a sensor, and meanwhile records the network access data of the user (e.g., the name of the shopping APP accessed by the user, the address of a webpage accessed by the user, and a commodity tag (e.g., a name and an inventory) clicked by the user).

2) The AR device sends to the server the environment picture collected by the camera, the environment location information collected by the sensor, the recorded access data of the user for the webpage, and the time length of the user staying on the webpage.

3) Based on the environment picture collected by the camera, the environment location information collected by the sensor, the access data of the user for the webpage, and the time length of the user staying on the webpage, the server ascertains that the user frequently accesses the shopping app regardless of time and place. Accordingly, the server pushes member discount information to the user, or/and recommends the user to open a paying member account to get discounts, or/and recommends credit card information to the user, or/and recommends information such as consumer loans in mobile payment tools to the user.

Example 4

This example is targeting at a scenario where the user uses an AR device to access a map APP.

1) The AR device collects an environment picture through a camera and collects environment location information through a sensor, and meanwhile records the network access data of the user (e.g., the name of the map APP accessed by the user, and the address of a webpage accessed by the user).

2) The AR device sends the environment picture collected by the camera, the environment location information collected by the sensor, the recorded access data of the user for the webpage to the server.

3) Through the environment picture collected by the camera and the environment location information collected by the sensor, the server analyzes the stream of people on the road surface using a preset algorithm. At the same time, the server reports the geographical location information after being authorized by the user, to form the data information about the stream of people at the geographical location on the road surface. The server pushes the data information about the stream of the people on the road surface to the page of the map APP used by the user in real time.

In addition, when finding that the number of people using the map APP through the AR, VR, MR devices and the like reaches a preset number, the server may calculate an adjusted route for the users of the AR, VR, MR devices according to the calculated road congestion status information, and push the adjusted route to the users.

Figure 4:
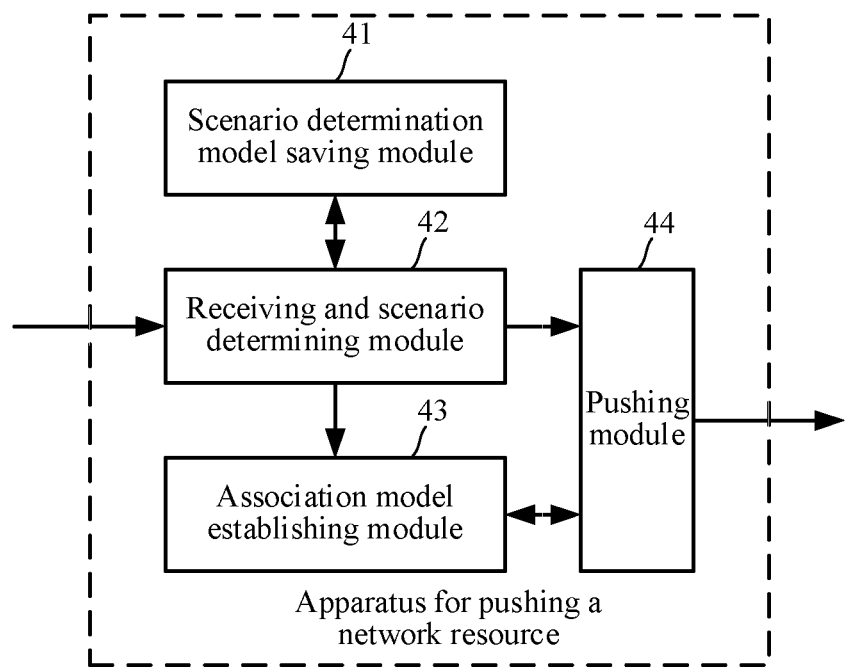
FIG. 4 is a schematic structural diagram of an apparatus for pushing a network resource provided in an embodiment of the present disclosure.

FIG. 4 is a schematic structural diagram of an apparatus for pushing a network resource provided in an embodiment of the present disclosure. The apparatus is provided on a server, and mainly includes: a scenario determination model saving module 41, a receiving and scenario determining module 42, an association model establishing module 43 and a pushing module 44. Here, The scenario determination model saving module 41 saves a scenario determination model, the scenario determination model being used to determine a scenario according to environment information.

The receiving and scenario determining module 42 receives information of a network resource accessed by a user which is reported by a device, and environment information of the user when the user accessing the network resource; inputs the environment information of the user when the user accessing the network resource into the scenario determination model saved in scenario determination model saving module 41, to obtain a scenario where the user is located; sends the obtained scenario where the user is located and the information of the network resource accessed by the user to the association model establishing module 43; receives, from the device, current environment information of the user, and inputs the current environment information of the user into the scenario determination model saved in scenario determination model saving module 41, to obtain a current scenario where the user is currently located; and sends the obtained current scenario to the pushing module 44.

The association model establishing module 43 establishes an association model between the scenario where the user is located and a type of the network resource accessed by the user, based on the scenario where the user is located and the information of the network resource accessed by the user received from the receiving and scenario determining module 42.

The pushing module 44 receives the obtained current scenario sent from the receiving and scenario determining module 42, and pushes a network resource of a type corresponding to the obtained current scenario to the user according to the established association model between the scenario where the user is located and the type of the network resource accessed by the user.

In practical application, the environment information of the user when the user accessing the network resource received by the receiving and scenario determining module 42 includes: environment location information collected through a sensor carried by the device, and an environment photograph collected through a camera carried by the device.

In practical application, the information of the network resource accessed by the user, reported by the device and received by the receiving and scenario determining module 42 includes: an address of a webpage accessed by the user and a content tag clicked by the user; or the address of the webpage accessed by the user, the content tag clicked by the user, and a time length of the user staying on the webpage.

In practical application, the content tag clicked by the user and received by the receiving and scenario determining module 42 includes one or more of a news information tag and a streaming media tag.

In practical application, the above device is an AR device, a VR device, or an MR device.

Embodiments of the present disclosure further provide a non-transitory computer readable storage medium storing an instruction. The instruction, when executed by a processor, causes the processor to perform the step in the method for pushing a network resource according to any one of steps 101-104, steps 201-205, or steps 301-305. The storage medium may include: a read-only memory (ROM), a random access memory (RAM), a magnetic disk, an optical disk, or the like.

Embodiments of the present disclosure further provide an electronic device. The electronic device includes the non-transitory computer readable storage medium as described above, and the processor that may access the non-transitory computer readable storage medium.

Figure 5:
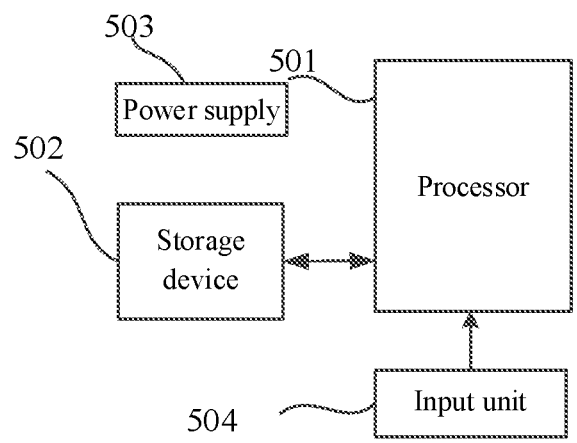
FIG. 5 is a schematic structural diagram of an electronic device involved in embodiments of the present disclosure.

The electronic device in embodiments of the present disclosure is, for example, a computer device, which may be the server or device in embodiments of the present disclosure. FIG. 5 shows a structure of the electronic device involved in embodiments of the present disclosure.

The electronic device may include a processor 501 including one or more processing cores, one or more storage devices 502, a power supply 503, an input unit 504 and other components. The storage devices 502 are computer readable storage media. The structure shown in FIG. 5 does not constitute a limitation to the server or the device, and may include more or fewer components than shown in FIG. 5, or a combination of some components, or a different component arrangement. Here:

The processor 501 is the control center of the computing device. Various interfaces and wires are adopted to connect the various parts of the entire electronic device, various functions of the electronic device are executed and data are processed by running or executing the software programs and/or modules stored in the memory 502 and by calling the data stored in the memory 502, so as to monitor the electronic device as a whole. Alternatively, the processor 501 may include one or more processing cores; the processor 501 may integrate an application processor and a modem processor, where the application processor mainly deals with the operating system, user interface, and application programs, etc. The modem processor mainly deals with wireless communication. It may be understood that the above modem processor may not be integrated into the processor 501.

The memory 502 may be used to store software programs and modules. The processor 501 executes the various functions, applications and data processing by running the software programs and modules stored in the memory 502. The memory 502 may mainly include a program storage area and a data storage area. The program storage area may store an operating system, an application program required by at least one function (such as a sound playback function, an image playback function, etc.), etc.; the data storage area may store data created by the usage of the electronic device, etc. In addition, the memory 502 may include a high-speed random access memory, and may also include a non-volatile (non-transitory) memory, such as at least one magnetic disk storage device, a flash memory device, or other volatile solid-state storage devices. Correspondingly, the memory 502 may also include a memory controller to provide the processor 501 with an access to the memory 502.

The electronic device also includes a power supply 503 for supplying power to various components. Preferably, the power supply 503 may be logically connected to the processor 501 through a power management system, so that functions such as charging, discharging, and power consumption management may be managed through the power management system. The power supply 503 may also include any components such as one or more DC (direct current) or AC (alternating current) power supplies, a recharging system, a power failure detection circuit, a power converter or inverter, and a power status indicator.

The electronic device may further include an input unit 504, which may be used to receive inputted digital or character information and generate keyboard, mouse, joystick, optical or trackball signal input related to user settings and function control.

Although not shown, the electronic device may further include a display unit and the like, which will not be repeated herein. Particularly, in embodiments of the present disclosure, the processor 501 in the computer will load the executable file corresponding to the process of one or more application programs into the memory 502 according to the following instructions, and the processor 501 will run the application programs stored in the memory 502, so as to implement the method for pushing network resources of the server or device described in the foregoing embodiments.

According to embodiments of the present disclosure, an association model between a scenario where a user is located and a type of a network resource accessed by the user is established. Then, when current environment information of the user sent from a device is received, a current scenario corresponding to the current environment information of the user is ascertained, and a network resource of a corresponding type is pushed to the user according to the association model between the scenario where the user is located and the type of the network resource accessed by the user. Thus, it is implemented that the network resource is pushed to the user according to the scenario.

The above descriptions are only preferred embodiments of the present disclosure, and are not intended to limit the scope of the present disclosure. Any modification, equivalent replacement, improvement, etc., made within the spirit and principle of the present disclosure, should be included in the protection scope of the present disclosure.

What is claimed is:

1. A method for pushing a network resource, comprising:
receiving information of a network resource accessed by a user and environment information of the user when the user accesses the network resource, the information of the network resource being reported by a device;
ascertaining, based on the environment information of the user when the user accesses the network resource, a scenario where the user is located by using a pre-established scenario determination model;
establishing an association model between the scenario where the user is located and a type of the network resource accessed by the user;
receiving, from the device, current environment information of the user, and ascertaining, based on the current environment information of the user, a current scenario corresponding to the current environment information of the user by using the scenario determination model; and
pushing, according to the association model between the scenario where the user is located and the type of the network resource accessed by the user, a network resource of a type corresponding to the ascertained current scenario to the user,
wherein the environment information of the user when the user accesses the network resource is acquired by: collecting environment location information through a sensor carried by the device, and collecting an environment photograph through a camera carried by the device,
wherein the ascertaining the scenario where the user is located comprises: inputting the environment location information and the environment photograph into the pre-established scenario determination model to obtain a corresponding scenario, and
wherein the method is performed by a processor.

2. The method according to claim 1, wherein the receiving, from the device, current environment information of the user comprises: receiving, from the device, current device data collected through a sensor.

3. The method according to claim 1, wherein the device is an AR device, a VR device, or an MR device.

4. The method according to claim 1, wherein the pushing, according to the association model between the scenario where the user is located and the type of the network resource accessed by the user, a network resource of a type corresponding to the current scenario to the user comprises:

searching, according to identifier information of the user, an association model between the scenario where the user is located and the type of the network resource accessed by the user, the found association model being corresponding to the user, ascertaining a type of network data corresponding to the current scenario according to the association model, and pushing the network resource to the user according to the ascertained type of the network data.

5. The method according to claim 1, wherein the information of the network resource accessed by the user comprises:
   an address of a webpage accessed by the user and a content tag clicked by the user; or
   the address of the webpage accessed by the user, the content tag clicked by the user and a time length of the user staying on the webpage.

6. The method according to claim 5, wherein the content tag comprises one or more of: a news information tag and a streaming media tag.

7. An apparatus for pushing a network resource, comprising:
   at least one processor; and
   a memory in communication with the at least one processor, wherein the memory stores instructions executable by the at least one processor, and the instructions, when executed by the at least one processor, cause the at least one processor to perform operations, the operations comprising:
   saving a scenario determination model, the model being used to determine a scenario according to environment information;
   receiving information of a network resource accessed by a user and environment information of the user when the user accesses the network resource, the information of the network resource being reported by a device;
   inputting the environment information of the user when the user accesses the network resource into the scenario determination model to obtain a scenario where the user is located;
   establishing an association model between the scenario where the user is located and a type of the network resource accessed by the user;
   receiving, from the device, current environment information of the user, and inputting the current environment information of the user into the scenario determination model to obtain a current scenario where the user is currently located; and
   pushing a network resource of a type corresponding to the obtained current scenario to the user according to the established association model between the scenario where the user is located and the type of the network resource accessed by the user,
   wherein the environment information of the user when the user accesses the network resource comprises: environment location information collected through a sensor carried by the device, and an environment photograph collected through a camera carried by the device.

8. The apparatus according to claim 7, wherein the device is an AR device, a VR device, or an MR device.

9. The apparatus according to claim 7, wherein the information of the network resource accessed by the user comprises:
   an address of a webpage accessed by the user and a content tag clicked by the user; or
   the address of the webpage accessed by the user, the content tag clicked by the user, and a time length of the user staying on the webpage.

10. The apparatus according to claim 9, wherein the content tag clicked by the user comprises one or more of a news information tag and a streaming media tag.

11. A non-transitory computer readable storage medium, storing an instruction, wherein the instruction, when executed by a processor, causes the processor to perform operations, the operations comprising:
   receiving information of a network resource accessed by a user and environment information of the user when the user accesses the network resource, the information of the network resource being reported by a device;
   ascertaining, based on the environment information of the user when the user accesses the network resource, a scenario where the user is located by using a pre-established scenario determination model;
   establishing an association model between the scenario where the user is located and a type of the network resource accessed by the user;
   receiving, from the device, current environment information of the user, and ascertaining, based on the current environment information of the user, a current scenario corresponding to the current environment information of the user by using the scenario determination model; and
   pushing, according to the association model between the scenario where the user is located and the type of the network resource accessed by the user, a network resource of a type corresponding to the ascertained current scenario to the user,
   wherein the environment information of the user when the user accesses the network resource is acquired by: collecting environment location information through a sensor carried by the device, and collecting an environment photograph through a camera carried by the device, and
   wherein ascertaining the scenario where the user is located comprises: inputting the environment location information and the environment photograph into the pre-established scenario determination model to obtain a corresponding scenario.

12. The medium according to claim 11, wherein the current environment information of the user comprises: receiving, from the device, current device data collected through a sensor.

13. The medium according to claim 11, wherein the device is an AR device, a VR device, or an MR device.

14. The medium according to claim 11, wherein the pushing, according to the association model between the scenario where the user is located and the type of the network resource accessed by the user, a network resource of a type corresponding to the current scenario to the user comprises:
   searching, according to identifier information of the user, an association model between the scenario where the user is located and the type of the network resource accessed by the user, the found association model being corresponding to the user, ascertaining a type of network data corresponding to the current scenario according to the association model, and pushing the network resource to the user according to the ascertained type of the network data.

15. The medium according to claim 11, wherein the information of the network resource accessed by the user comprises:

an address of a webpage accessed by the user and a content tag clicked by the user; or the address of the webpage accessed by the user, the content tag clicked by the user and a time length of the user staying on the webpage.

16. The medium according to claim 15, wherein the content tag comprises one or more of: a news information tag and a streaming media tag.

\* \* \* \* \*